United States Patent [19]

Whiting

[11] Patent Number: 4,645,887
[45] Date of Patent: Feb. 24, 1987

[54] PRESSURE DIFFERENTIAL BYPASS SENSOR SWITCH

[75] Inventor: James C. Whiting, High Point, N.C.

[73] Assignee: Facet Enterprises, Inc., Tulsa, Okla.

[21] Appl. No.: 803,299

[22] Filed: Dec. 2, 1985

[51] Int. Cl.$^4$ .......................................... H01H 35/38
[52] U.S. Cl. .................... 200/82 E; 335/154;
 335/205; 73/38; 73/745; 340/607
[58] Field of Search ................... 200/302, 82 R, 82 B,
 200/82 E, 81 R, 81.9 M, 308; 335/205, 151,
 154; 91/1; 73/38, 745, DIG. 5; 340/606, 607,
 611, 626, 60

[56] References Cited

U.S. PATENT DOCUMENTS

| | | | |
|---|---|---|---|
| 3,327,079 | 6/1967 | Widl | 200/82 E |
| 3,644,915 | 2/1972 | McBurnett | 340/607 |
| 3,813,622 | 5/1974 | Remington | 335/151 |
| 4,025,885 | 5/1977 | Giannini | 335/154 |
| 4,130,745 | 12/1978 | Hetzer | 200/82 E |
| 4,426,952 | 1/1984 | Crisp, Jr. | 73/38 |

Primary Examiner—G. P. Tolin
Attorney, Agent, or Firm—Remy J. VanOphem; Gifford, VanOphem & Sprinkle

[57] ABSTRACT

A pressure differential bypass sensor switch that utilizes the change in piston of a permanent magnet that is carried by a reciprocable position to actuate the switching element of an axial travel switch by the change in magnetic forces that act on the switching element as a result of the change in position of the reciprocable piston and the permanent magnet. Opposite sides of the piston are exposed, respectively, to the high pressure and low pressure sides of a filter in a liquid circulating system, and the piston is normally positioned at the high pressure side of a passage in which it travels by a spring that acts on it from the low pressure side. As the filter becomes clogged the pressure drop across it and, therefore, across the piston will increase, and the piston is calibrated so that an excessive pressure drop will drive it to the low pressure side. This movement of the piston will carry the permanent magnet to a different position relative to the switching element of the axial travel switch and change the magnetic forces acting on the switching element to provide a warning signal indicating an impending filter bypass operating condition.

16 Claims, 4 Drawing Figures

PRESSURE DIFFERENTIAL BYPASS SENSOR SWITCH

BACKGROUND OF THE INVENTION

1. Field of the Invention

This invention relates to an electrical switch for use in switching to a bypass circuit of a liquid circulation system, such as an hydraulic system or a lubrication system for circulating lubricating oil. More particularly, this invention relates to a pressure differential switch that self-actuates as a result of an excessive pressure differential in a liquid circulation system.

2. Description of the Prior Art

U.S. Pat. No. 4,130,745, to Hetzer, discloses a pressure differential detector switch utilizing a piston which is free to travel within a housing. One side of the piston is exposed to the high pressure side of a pressure differential application, and the other side is exposed to the low pressure side. A spring is provided in the housing to resiliently urge the piston toward the high pressure side, in cooperation with the pressure on the low pressure side. When the force on the piston resulting from pressure differential between the high pressure side and the low pressure side exceeds the force on the piston resulting from the spring, the pressure differential force will move the piston away from the high pressure side to compress the spring. The piston carries a permanent magnet, and a reed switch is positioned on the outside of the housing to be magnetically actuated by the change in position by the travel of the piston that results from an excessive pressure differential condition. A reed switch of the type utilized in the device disclosed in this patent has limited current carrying capacity and a high resonant frequency due to its low moving mass and high spring constant.

SUMMARY OF THE INVENTION

According to the present invention there is provided a pressure differential sensor with an integrally associated switch in which the switch has a switching element which moves axially during switching and which is capable of carrying high current levels. A sensor of this type takes up less space than a reed switch, and can be used in applications where available space is limited. Such a switch, which is called an axial travel switch, may have a lower resonant frequency than a reed switch of comparable size because of its greater moving mass and low spring constant, and is generally more economical than a reed switch.

The pressure differential sensor switch according to the present invention is designed to be utilized in a liquid circulation system, such as an hydraulic system or a circulating oil lubrication system, to sense the contamination of the filter that is usually used in such a system, the gradual contamination of the filter leading to a gradually increasing pressure differential between the inlet, or high pressure side of the filter, and the outlet, or low pressure side of the filter. The sensor of the pressure differential sensor switch is calibrated to actuate the switch that is a part thereof when the pressure differential across the filter reaches a predetermined allowable maximum, corresponding to a maximum allowable degree of contamination of the filter. The electrical signal from the switch, when actuated, can be used to disconnect the pump that is used to circulate the liquid being filtered, sound an alarm horn, turn on a signal light, or switch the operation of the liquid circulating system to a mode in which the filter is bypassed.

The pressure differential sensor switch according to the present invention has a housing with a cylindrical passage therein. A floating piston is positioned in the cylindrical passage of the housing, and the opposite sides of the piston are connected to the high pressure and low pressure sides of the associated filter, respectively, through openings in the housing. A spring is provided to resiliently urge the piston toward the high pressure end of the cylindrical passage, and the force of the spring acting on the piston will maintain the piston at the high pressure end until the pressure differential across the piston reaches a predetermined value. When the pressure differential across the piston reaches the predetermined value, the force resulting from the pressure differential will exceed the force resulting from the spring. The resultant of the pressure differential and spring forces will then move the piston within the cylindrical passage to the low pressure end of the passage. The piston carries a permanent magnet attached to one end thereof, and the movement of the piston in the cylindrical passage is utilized to actuate the associated switch by the change in magnetic forces resulting from the change in the position of the magnet, as it moves with the piston.

The magnet position sensing switch that is used to sense the change in position of the magnet is an axial travel switch which utilizes a movable magnetic-iron armature element, the switch being moved from its normally open position to a closed position by the magnetic force that acts thereon when the permanent magnet carried by the pressure differential sensing piston moves with respect to the axial travel switch as a result of an excessive pressure differential condition. The movement of the axial travel switch is axially of the magnetic-iron armature element of the switch, an arrangement which helps to prevent accidental movement of the switch element as a result of mechanical vibrations or impacts in the associated system due to the relatively high inertia of the switching element with respect to movement in the axial direction. The switch is arranged, with respect to the piston, so that the path of travel of the switch is normal to the path of the travel of the piston. In a system where the central axis of the switching element is not in alignment with the principal axis of any vibrations imposed on the system, this arrangement will help to insure that the switching element will be moved from the opened position to the closed position when an excessive pressure differential condition does develop, because the perpendicularity of the path of travel of the axial travel switch leads to a high maximum to minimum differential of the magnetic force acting on the axial travel switch for a given amount of movement of the pressure differential sensing piston.

Because the pressure differential sensor switch of the present invention is designed to be used in an environment that is subject to mechanical impacts or vibrations, the elements of the switch are housed in a rugged housing and the non-movable elements of the switch are retained in position within the housing by an epoxy potting compound that imparts good shock resistance to them. The housing is provided with a pair of spaced-apart raised mounting bosses to permit it to be securely affixed at two locations to the structure of the liquid circulating system. The portion of the sensor switch that houses the axial travel switch is hermetically sealed from the portion that houses the pressure differential sensing piston and from the environment external to the bypass sensor switch, with the electrical leads to and from the switch being sealed at the location of their entry into the switch chamber. The pressure differential sensing piston is protected from contamination by any dirt or other impurities in the circulating fluid by a filter that extends across the inlet port, and a low frictional hysteresis Teflon ® seal is provided to seal the movement of the pressure differential sensing piston for rapid response to a high pressure differential condition while maintaining an effective seal.

Accordingly, it is an object of the present invention to provide an improved pressure differential bypass sensor switch.

It is a further object of the present invention to provide a pressure differential bypass sensor switch that utilizes a switching element that moves axially during its switching movement.

It is a further object of the present invention to provide a pressure differential bypass sensor switch with an electrical switching element that has improved current carrying capability.

For a further understanding of the present invention and the objects thereof, attention is directed to the drawing and the following description thereof, to the detailed description of the invention and to the appended claims.

DETAILED DESCRIPTION OF THE PREFERRED EMBODIMENT

Figure 1:
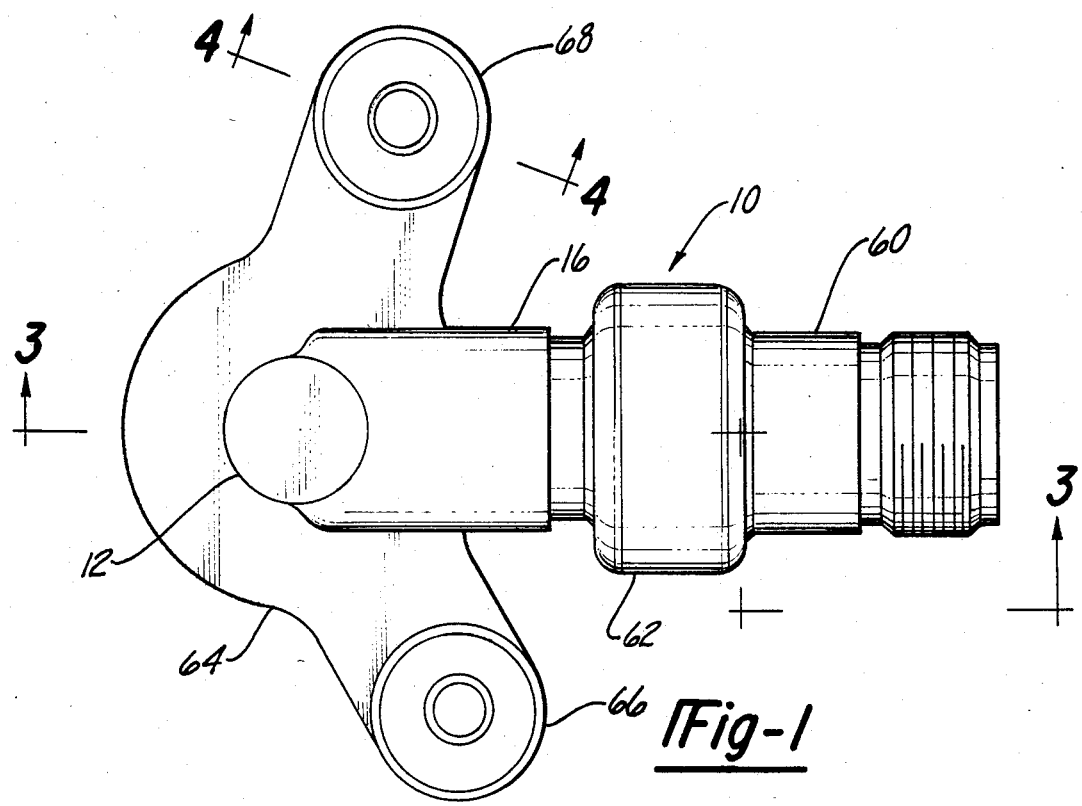
FIG. 1 is a plan view of a pressure differential bypass sensor switch.
Figure 2:
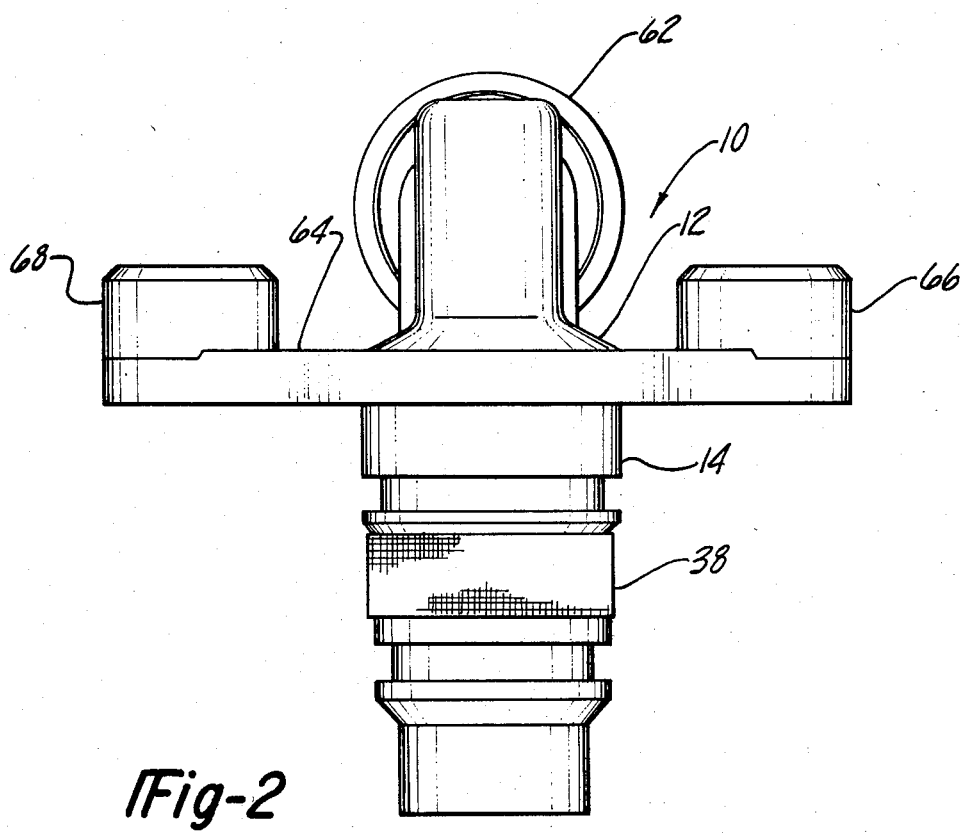
FIG. 2 is a side elevational view of the pressure differential bypass sensor switch illustrated in FIG. 1.

A pressure differential bypass sensor switch according to the present invention is generally indicated by reference numeral 10. The sensor switch 10 includes a housing 12, and the housing 12 includes first and second hollow legs 14 and 16 that extend perpendicularly with respect to one another. The first leg 14 is bored to define a first passage 18 therein, and the second leg 16 is also bored to define a second passage 20 therein. The first passage 18 has a central axis 18a extending therethrough, and the second passage 20 has a central axis 20a extending therethrough. The central axis 18a of the first passage 18 and the central axis 20a of the second passage 20 intersect each other at a right angle, for reasons which will be subsequently discussed more fully. However, as illustrated in FIG. 3, the second passage 20 stops before it intersects the first passage 18 and a portion of the housing 12a separates the first passage 18 from the second passage 20.

A reciprocable piston 22 is positioned within the first passage 18 of the housing 12, and is reciprocable in the first passage 18 along the central axis 18a thereof. The reciprocable piston 22 has its maximum radial extent at a radially outwardly projecting annular shoulder 24 and the radial extent of the annular shoulder 24, or diameter in the case of an annular shoulder of circular configuration, forms a close moving fit with the inside of the first passage 18, as is shown in FIG. 3. The end of the first passage 18 which is away from the location of the intersection of the central axis 18a of the first passage 18 and the central axis 20a of the second passage 20, which is at the lower end of the sensor switch 10, as depicted in FIG. 3, is open, and is partially closed by an annular spring retainer 26. The annular spring retainer 26 has a radially outermost portion 26a in the form of a shoulder, and is removably held in place relative to the open end of the first passage 18 by means of a split retaining ring 28, the outermost portion of which is removably received in an annular slot 30 that extends radially outwardly from the first passage 18, near the open end thereof. A compression spring 32 is trapped between one side of the annular shoulder 24, shown as being the underside in FIG. 3, and one side of the annular spring retainer 26, shown as being the upper side in FIG. 3, and the compression spring 32 resiliently biases the reciprocable piston 22 upwardly within the first passage 18 in the arrangement depicted in FIG. 3.

Figure 3:
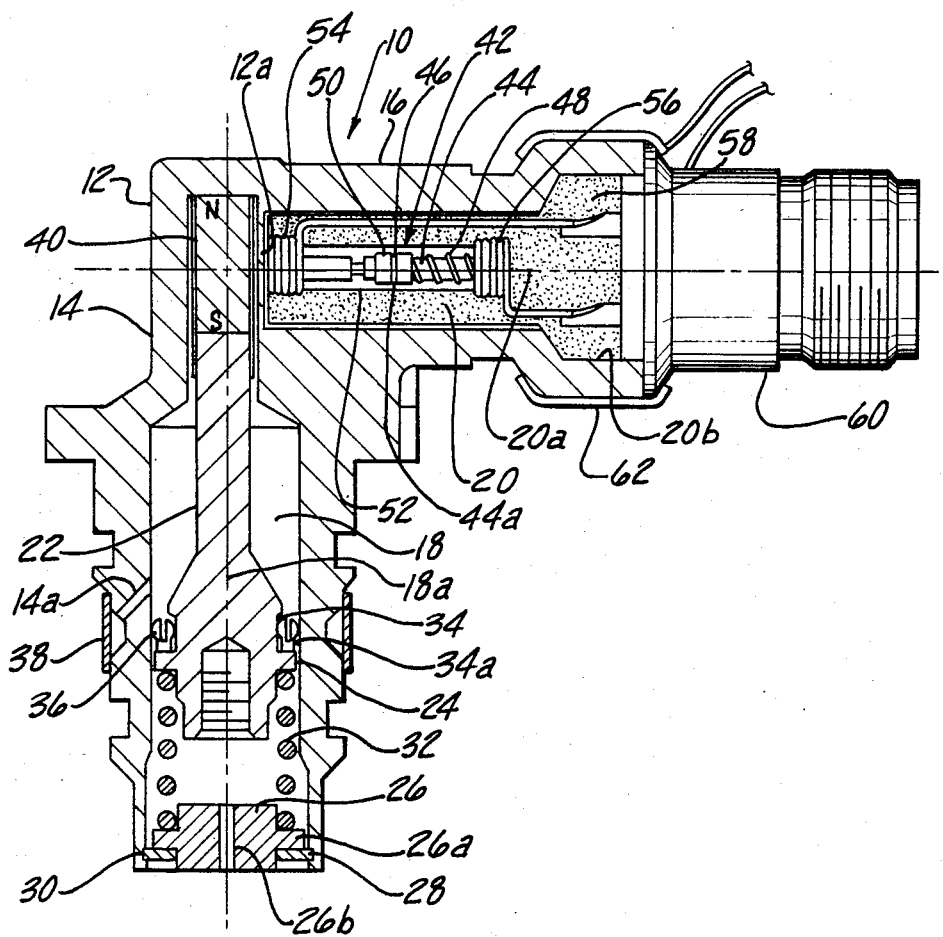
FIG. 3 is an offset partially sectional view taken along line 3—3 of FIG. 1.
Figure 4:
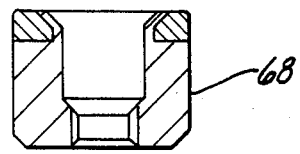
FIG. 4 is a sectional view taken along line 4—4 of FIG. 1.

In the orientation of the bypass sensor switch 10 that is depicted in FIG. 3 the annular shoulder 24 has an underside which is exposed to the low pressure side of a pressurized fluid being circulated in a fluid circulation system, for example, hydraulic fluid in an hydraulic system or lubricating oil in a lubricating oil system, through an opening 26b in the spring retaining ring 26. The upper side of the annular shoulder 24, in turn, is exposed to the high pressure side of the circulating fluid in the circulating system through an opening 14a in the first leg 14. The pressure differential between the pressure at the opening 14a and the pressure at the opening 26b exists by virtue of an obstruction to flow in the fluid circulating system, for example, a filter (not shown), wherein the pressure at the opening 14a is the pressure at the inlet to such filter and the pressure at the opening 26b is the pressure at the outlet of such filter. The pressure differential between the pressure at the opening 14a and the pressure at the opening 26b exerts a pressure differential force on the reciprocable piston 22 which tends to move the reciprocable piston 22 against the force exerted thereon by the compression spring 32, toward the opening 26b. The sensor switch 10 is calibrated so that the pressure differential force acting on the reciprocable piston 22, by virtue of the pressure differential between the pressure at the opening 14a and the pressure at the opening 26b, is normally insufficient to overcome the oppositely directed force imposed by the compression spring 32, when the pressure drop across the associated filter is within allowable limits. The sensor switch 10 is also calibrated so that the pressure differential force acting on the reciprocable piston 22 will exceed the force of the compression spring 32 acting on the piston, when the associated filter has become unduely contaminated, which will result in an excessive pressure differential thereacross.

The reciprocable piston 22 has a radially inwardly projecting annular groove 34 which, in cooperation with the annular shoulder 24, forms an annular recess 34a. An annular seal 36 is positioned in the annular recess 34a and is trapped therein. Thus, the annular seal 36 will reciprocate to and fro with the reciprocable piston 22, to slidingly seal the opening 14a into the first passage 18 from the opening 26b into the first passage 18. Preferably, the annular seal 36 is a pressure-energized polymeric seal, such as a Teflon ® seal, which is capable of providing an effective sealing characteristic, while maintaining low frictional hysteresis characteristics in the system as the reciprocable piston reciprocates to and fro within the first passage 18. To prevent any contaminants which are in the circulating liquid from damaging or otherwise interfering with the proper operation of the reciprocable piston 22, an annular filter 38 is positioned around the first leg 14, to remove any such contaminants from the circulating liquid before it enters into the first passage 18 through the opening 14a.

An elongate permanent magnet 40 is attached to the upper end of the reciprocable piston 22, and the permanent magnet 40, because it is carried by the reciprocable piston 22, reciprocates therewith, to and fro within the first passage 18, in response to the change in the relationship between the pressure differential and the spring forces that act on the reciprocable piston 22, as described above.

An axial travel switch, identified generally by reference numeral 42, is positioned in the second passage 20 of the housing 12. In the illustrated embodiment, the axial travel switch 42 is of the normally open type; a type which is commercially available from Electronic Applications Co. in El Monte, Calif. and a type which purports to be manufactured under U.S. Pat. No. 3,813,622. The axial travel switch 42 includes an axially movable switching element 44 that is in the shape of a relatively long, slender rod, with a central axis being coaxial with the central axis 20a of the second passage 20. The switching travel of the axially movable switching element 44 is along its central axis, a direction in which the inertia of the axially movable switching element is at a maximum and, therefore, a direction in which there is maximum resistance to travel. The axially movable switching element 44 is manufactured from a magnet-iron and it functions as a movable pole piece in a magnetic circuit which includes a fixed pole piece 50 that functions as the armature in the magnetic circuit and which is normally spaced from a contact surface 44a on the switching element 44 by a magnetic gap 46. The switching element 44 is biased away from the fixed pole piece 50 by a spring 48, but the force of the spring 48 is not sufficient to maintain the switching element 44 out of contact with the fixed pole piece 50 when the axial travel switch is exposed to an external magnetic field by the movement of the permanent magnet 40 toward the opening 26b, as described above. The switching element 44, the fixed pole piece 50 and the spring 48 are sealed in a glass tube 52 to protect their electrical and magnetic characteristics from change due to a change in humidity or other environmental characteristics and to protect them from external physical impacts. The opposite ends of the glass tube 52 are capped by metallic end caps, not shown, and are surrounded by spring clips 54 and 56, respectively, which permit the attachment of electrical leads, not shown, to the ends of the axial travel switch 42 without soldering. The entire axial travel switch 42 is securely positioned within the second passage 20 by means of an epoxy potting compound 58. A metered charge of uncured epoxy compound 58 is placed in the second passage 20 before the axial travel switch 42 is placed into the second passage 20. The axial travel switch 42 is placed into the uncured epoxy potting compound 58 in the second passage 20 causing the uncured epoxy potting compound 58 to fill out the second passage 20. The epoxy potting compound 58 is then cured.

When the pressure differential across the filter in the liquid circulating system exceeds a predetermined value, the reciprocable piston 22 will be driven downwardly toward the opening 26b by the excess of the force resulting from the pressure differential over the force exerted by the compression spring 32, as previously described, and this will bring the north pole of the permanent magnet 40 into a position of alignment with the end of the axial travel switch 42 that is adjacent thereto. The magnetic force, thus, exerted on the axially movable switching element 44 by the north pole of the permanent magnet 40 will attract the axially movable switching element 44 toward the permanent magnet 40, to bring the contact surface 44a of the axially movable switching element 44 into a closed condition in the fixed pole piece 50, thus, permitting electrical power to flow through the leads that connect, respectively, to the axially movable switching element 44 and the fixed pole piece 50. The power flowing through the electrical leads is used to activate other elements of the liquid circulating system (not shown) to bypass the associated filter, as explained above, or to perform some other useful function, for example, lighting a signal light, or sounding an alarm horn, to indicate the existence of an excessive pressure differential condition in the associated filter.

The second passage 20 has an extreme end 20b through which the axial travel switch 42 is inserted. After the insertion of the axial travel switch 42 in the epoxy potting compound 58, as heretofore described, the extreme end 20b of the second passage 20 is sealingly closed by attaching a standard switch/receptacle assembly 60 to the second leg 16 of the sensor switch 10. The switch/receptacle assembly 60 is attached to the second leg 16 of the sensor switch 10 by means of a retainer sleeve 62, for example, a metal sleeve which is swagged into the configuration depicted in FIG. 3 after the switch/receptacle assembly 60 is assembled into the desired position relative to the second leg 16 of the housing 12.

To permit the sensor switch to be securely mounted relative to an associated element of the liquid circulating system, not shown, the housing 12 is also provided with a flange 64 that extends outwardly from each side thereof. The opposite ends of the flange 64 are provided with raised bosses 66 and 68 to provide for secure, two-point attachment of the housing 12 of the sensor switch 10 to suitable mounting lugs on the associated element.

As is most clearly shown in FIG. 3, the central axis 20a of the second passage 20 extends substantially perpendicularly with respect to the central axis 18a of the first passage 18. This relationship between the central axis 18a and the central axis 20a provides for a maximum differential equal in the magnetic forces acting on the axially movable switching element 44 for a given length of travel of the reciprocable piston 22. Preferably, the length of travel of the reciprocable piston 22 is sufficient so that the north end of the permanent magnet 40 will lie below the central axis 20a of the second passage 20 when the reciprocable piston 22 has been driven toward the opening 26b by an excessive pressure across it, to impose maximum magnetic forces on the axially movable switching element 44. When the reciprocable piston 22 is away from the opening 26b as is shown in FIG. 3, preferably the central axis 20a of the second passage 20 will extend equidistantly between the north and south poles of the permanent magnet 40 and in such an arrangement, the permanent magnet will be in a position of magnetic neutrality with respect to the axially movable switching element 44.

Having, thus, described the present invention by way of an exemplary embodiment, it will be apparent to those skilled in the art that many modifications may be made from the exemplary embodiment without departing from the spirit of the present invention or the scope of the claims appended thereto.

What is claimed is:

1. A pressure differential sensor switch for use in a fluid circulating system, said pressure differential sensor switch being adapted to perform an electrical switching function when an excessive pressure differential develops between a high fluid pressure location in the system and a low fluid pressure location in the system, said pressure differential sensor switch comprising:

a housing having a first passage with a central axis and a second passage, with a central axis said first passage having a first opening that is exposed to said high fluid pressure location and a second opening that is exposed to said low fluid pressure location, said central axis of said second passage being disposed in a non-parallel orientation with respect to said central axis of said first passage;

a reciprocable piston located in said first passage of said housing and reciprocable therein, said reciprocable piston being reciprocable in said first passage of said housing between a first piston location adjacent said first opening and a second piston location adjacent said second opening, said reciprocable piston having a first side that is exposed to the pressure at said high fluid pressure location through said first opening and a second side that is exposed to the pressure at said low fluid pressure location through said second opening;

biasing means located in said first passage of said housing and resiliently biasing said reciprocable piston toward said first piston location, the force exerted by said biasing means being sufficient to maintain said reciprocable piston at said first piston location when the differential in pressure between said pressure at said high fluid pressure location and said pressure at said low fluid pressure location is below a predetermined differential in pressure, the force exerted by said biasing means also being insufficient to maintain said piston at said first piston location when said differential in pressure exceeds said predetermined differential in pressure, whereby said reciprocable piston will move to said second piston location when said differential in pressure exceeds said predetermined differential in pressure;

a permanent magnet carried by said reciprocable piston and reciprocable therewith; and an axial travel electrical switch located in said second passage of said housing, said axial travel electrical switch having a switching element that is movable only along said central axis of said second passage between a first position and a second position, one of said first position and said second position being a switch opened position and the other of said first position and said second position being a switch closed position, said switching element of said axial travel electrical switch being responsive to magnetic forces and being adapted to be moved by magnetic force from one of said first position and said second position to the other of said first position and said second position, said second passage being positioned relative to said first passage such that said permanent magnet acts magnetically on said switching element of said axial travel electrical switch to move said switching element of said axial travel electrical switch from said one of said first position and said second position to the other of said first position and said second position when said reciprocable piston moves in said first passage from said first piston location to said second piston location to move said permanent magnet that is carried by said reciprocable piston.

2. The pressure differential sensor switch according to claim 1 wherein said central axis of said second passage is oriented substantially perpendicularly with respect to said central axis of said first passage.

3. The pressure differential sensor switch according to claim 2 wherein said permanent magnet is elongate in configuration and has a first end, a second end, and a central axis extending through said first end, one of said first end and said second end being of a given magnetic polarity and the other of said first end and said second end being of the opposite magnetic polarity, the travel of said permanent magnet, with said reciprocable piston, being along said central axis of said permanent magnet.

4. The pressure differential sensor switch according to claim 3 wherein said axial travel electrical switch has a central axis, wherein the axial movement of said switching element of said axial travel electrical switch is along said central axis and wherein said central axis of said axial travel switch extends between said first end and said second end of said permanent magnet when said reciprocable piston is at said second piston location in said first passage.

5. The pressure differential sensor switch according to claim 4 wherein said central axis is external both to said first end and said second end of said permanent magnet when said reciprocable piston is at said first piston location in said first passage.

6. The pressure differential sensor switch according to claim 1 wherein said biasing means comprises a spring.

7. The pressure differential sensor switch according to claim 1 further comprising:

filter means separating said first side of said reciprocable piston from said high fluid pressure location to help to prevent said reciprocable piston from being damaged by any contaminants in said fluid.

8. The pressure differential sensor switch according to claim 1 wherein said reciprocable piston comprises an annular groove on the outside thereof between said first side of said reciprocable piston and said second side of said reciprocable piston and further comprising:

annular seal means located in said annular groove, said annular seal means being sealingly slidable along said first passage when said reciprocable piston reciprocates in said first passage to seal said first side of said reciprocable piston from said second side of said reciprocable piston.

9. The pressure differential sensor switch according to claim 8 wherein said annular seal means comprises an annular sealing element, said annular sealing element being formed from a low frictional hysteresis polymeric material.

10. The pressure differential sensor switch according to claim 1 wherein said reciprocable piston comprises a radially outwardly extending annular shoulder and further comprises annular recess means, said annular recess means forming, with said radially outwardly extending annular shoulder, an annular groove, and further comprising:

annular seal means located in said annular groove, said annular seal means being sealingly slidable along said first passage when said reciprocable piston reciprocates in said first passage to seal said first side of said reciprocable piston from said second side of said reciprocable piston.

11. The pressure differential sensor switch according to claim 10 wherein said annular seal means comprises an annular sealing element, said annular sealing element being formed from a low frictional hysteresis polymeric material.

12. The pressure differential sensor switch according to claim 1 further comprising:
a stationary electrical contact positioned in said axial travel electrical switch, the axial travel of said switching element of said axial travel electrical switch bringing said switching element of said axial travel electrical switch into contact with said stationary electrical contact when said switching element of said axial travel electrical switch is in one of said first position and said second position and bringing said switching element of said axial travel electrical switch out of contact with said stationary electrical contact when said switching element of said axial travel electrical switch is in the other of said first position and said second position.

13. The pressure differential sensor switch according to claim 12 further comprising:
first and second electrical leads, one of said first and second electrical leads being connected to said switching element of said axial travel electrical switch, the other of said first and second electrical leads being connected to said stationary electrical contact.

14. The pressure differential sensor switch according to claim 13 wherein said first and second electrical leads extend outwardly of said second passage of said housing and further comprising:
sealing means for sealing said second passage of said housing, said first and second electrical leads extending through said sealing means.

15. The pressure differential sensor switch according to claim 14 and further comprising potting compound means surrounding said axial travel electrical switch in said second passage of said pressure differential sensor switch.

16. The pressure differential sensor switch according to claim 1 wherein said housing further comprises a plurality of mounting bosses formed integrally with said housing to permit said housing to be securely attached at a plurality of locations to another element in said fluid circulating system.

* * * * *

UNITED STATES PATENT AND TRADEMARK OFFICE
CERTIFICATE OF CORRECTION

PATENT NO. : 4,645,887
DATED : February 24, 1987
INVENTOR(S) : James C. Whiting

It is certified that error appears in the above-identified patent and that said Letters Patent is hereby corrected as shown below:

Column 7, line 14, after "passage" delete the comma ",", same line after "axis" insert a comma ---- , ----.

In the Abstract

Line 2, delete "piston" and insert ---- position ----.

Line 3, delete "position" and insert ---- piston ----.

Signed and Sealed this

Twenty-seventh Day of October, 1987

Attest:

DONALD J. QUIGG

*Attesting Officer*   *Commissioner of Patents and Trademarks*